United States Patent
Johansson et al.

(10) Patent No.: US 7,483,401 B2
(45) Date of Patent: Jan. 27, 2009

(54) DYNAMIC ALLOCATION OF FREQUENCY SPECTRUM

(75) Inventors: Per Håkan Albin Johansson, Haninge (SE); Per Ödling, Älvsjö (SE); Pål Frenger, Vällingby (SE); Björn Olof Bohlin, Tyresö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 790 days.

(21) Appl. No.: 10/496,027

(22) PCT Filed: Nov. 21, 2001

(86) PCT No.: PCT/SE01/02575

§ 371 (c)(1), (2), (4) Date: Nov. 11, 2004

(87) PCT Pub. No.: WO03/044979

PCT Pub. Date: May 30, 2003

(65) Prior Publication Data

US 2005/0089114 A1 Apr. 28, 2005

(51) Int. Cl.
*H04J 1/00* (2006.01)
*H04J 3/16* (2006.01)
*H04L 12/413* (2006.01)
*H04L 12/28* (2006.01)
*H04M 1/56* (2006.01)
*H04M 1/76* (2006.01)

(52) U.S. Cl. .................. 370/281; 370/468; 370/445; 370/431; 379/142.01; 379/417

(58) Field of Classification Search .............. 370/347, 370/446; 375/147, 262, 346; 455/462
See application file for complete search history.

(56) References Cited

U.S. PATENT DOCUMENTS

| | | | | |
|---|---|---|---|---|
| 4,969,205 A | * | 11/1990 | Itoh | 455/462 |
| 5,381,447 A | * | 1/1995 | Ayerst et al. | 375/147 |
| 5,416,780 A | * | 5/1995 | Patel | 370/347 |
| 5,532,603 A | | 7/1996 | Botman | |
| 5,608,755 A | | 3/1997 | Rakib | |

(Continued)

FOREIGN PATENT DOCUMENTS

EP 0987852 A2 3/2000

(Continued)

OTHER PUBLICATIONS

Swedish Patent Office; International Search Report for PCT/SE01/02575; Jun. 27, 2002.

*Primary Examiner*—Hanh Nguyen

(57) ABSTRACT

A method and arrangement in a communication system for dynamically allocating communication system frequency spectrum after cross-talk interface between transmission medias used for upstream and downstream communication in the frequency spectrum. After detecting cross-talk interface on a disturbed transmission medium caused by transmission on a disturbing transmission medium, the arrangement transmit a media control signal on the disturbed transmission medium and detects a reproduced media control signal that is reproduced due to cross-talk on the disturbing transmission medium. The disturbed or disturbing transmission media can then be dynamically allocated different frequency spectrum to eliminate the interface. In one embodiment, each transmission medium has a default transmission direction, and if one of the transmission is in a direction opposite the default direction, that transmission is reassigned to another transmission medium.

22 Claims, 6 Drawing Sheets

U.S. PATENT DOCUMENTS

| | | | |
|---|---|---|---|
| 5,751,152 A | | 5/1998 | Dubose et al. |
| 5,978,385 A | * | 11/1999 | Haddock et al. ............. 370/446 |
| 6,167,095 A | * | 12/2000 | Furukawa et al. ........... 375/285 |
| 6,332,006 B1 | * | 12/2001 | Rydbeck et al. ............. 375/262 |
| 7,260,067 B2 | * | 8/2007 | Reddy ........................ 370/252 |
| 2003/0086514 A1 | * | 5/2003 | Ginis et al. .................. 375/346 |

FOREIGN PATENT DOCUMENTS

| | | |
|---|---|---|
| EP | 1093248 A1 | 4/2001 |
| EP | 1093248 B1 | 7/2003 |

* cited by examiner

DYNAMIC ALLOCATION OF FREQUENCY SPECTRUM

TECHNICAL FIELD OF THE INVENTION

The present invention relates to methods and arrangements for dynamically allocating communication system frequency spectrum after interference between transmission medias using the frequency spectrum.

DESCRIPTION OF RELATED ART

Resource handling and resource utilization are fundaments of any modern communication. In the case of Very-high-speed Digital Subscriber Line VDSL modems, this fundamental issue is represented by frequency planning. The frequency planning in VDSL has to take many aspects into consideration: political, economical, and practical. Different frequency plans fit different services favored by one or the other operator and practical issues introduce many side constraints. Examples of these practical aspects are the location of HAM bands for radio amateurs and the frequency plans of other broadband systems, for instance Asymmetrical Digital Subscriber Line ADSL. Most common systems of today, including VDSL, use fixed allocation of the frequency spectrum. This leads to under-utilization of the medium.

Signaling in the copper plant is subject to cross-talk, which means that communication on a given line is disturbed by signals transmitted on other lines. The coupling between lines in general increases with frequency but can vary substantially from line to line. However, into any given line, the cross-talk is usually strong only from a small number of other lines.

Modern Digital Subscriber Line DSL systems are designed to be limited by either near-end cross-talk NEXT or far-end cross-talk FEXT. For FEXT limited systems, frequency planning is necessary in order to control cross-talk, that is, to avoid NEXT. While NEXT-limited systems do not need any spectrum management, they could still benefit from transmit-power management. In FEXT-limited systems, upstream and downstream traffic is typically assigned to different frequency bands. Without this frequency division duplexing FDD, the NEXT would severely reduce the available capacity in the network. As an analogy to this type of multi-user interference, we can compare with the situation in a cellular radio-communication system. The copper lines in a DSL system interfere significantly with only a few neighboring lines and thereby function as directional antennas do in a cellular system. However, cellular radio systems usually have much more sophisticated resource allocation mechanisms than only FDD. Correspondingly, the lack of efficient resource allocation mechanisms in the copper plant leads to a significant under-utilization of the available resources. In a U.S. Pat. No. 6,167,095 is disclosed a method for variably allocating upstream and downstream communication spectra. In the US patent, upstream and downstream portions of the frequency spectrum are allocated based on computed signal quality parameters representative of the line conditions. The signal must be characterized before the allocation of frequency bands in the spectra takes place. Chaotic resource allocation will potentially lead to system breakdown. To avoid system breakdown, coordination between the modems is necessary. Without the present invention, this in general requires a central site determining the upstream and downstream carrier frequencies depending on the line noise characteristics.

SUMMARY OF THE INVENTION

The present invention solves problems related to dynamic and efficient allocation of frequency spectrum without using a central coordinating device. Using cross-talk coupling between medias in order to make some of the medias observant of a possible disturbing situation solves the problem. The invention uses the fact that interference and cross-talk coupling is symmetric in the sense that if interference arises on a disturbed first transmission media due to cross-talk coupling of transmission on a disturbing second transmission media, a cross-talk coupling also exists in the converse direction. Due to the symmetry in the cross-talk coupling, transmission on the first media will arise via the cross-talk coupling as interference on the second media. According to the invention, a media control signal is sent on the disturbed media after cross-talk interference. The media control signal then reproduces and is detected on the disturbing media. Depending on whether the involved medias are used in a defined default direction or in a direction opposite the default direction, different measures will be taken.

More in detail in a first embodiment, cross-talk interference is detected on a disturbed transmission media used by a disturbed set of modem pair in a communication system. A disturbing transmission media, used by a disturbing set of modem pair in the system, causes the interference due to a cross-talk coupling. A media control signal is sent by the disturbed set of modem pair on the disturbed media. The media control signal is reproduced on the disturbing media due to the cross-talk coupling and is detected by the disturbing set of modem pair.

More in detail in a second embodiment, collision avoidance data is transmitted in resources of frequency spectrum on a disturbing transmission media by a receiving-end modem of a disturbing set of modem pair. The purpose of the collision avoidance data is to avoid collision in the form of strong NEXT interference. Cross-talk interference is detected on a disturbed transmission media used by a disturbed set of modem pair. The collision avoidance data on the disturbing media causes the interference due to a cross-talk coupling. A media control signal is sent by the disturbed set of modem pair on the disturbed media. The media control signal is reproduced on the disturbing media due to the cross-talk coupling and is detected by the disturbing set of modem pair.

More in detail in a third embodiment, modem-pairs in the system that are influenced by interference are synchronized in time. Collision avoidance data is then simultaneously transmitted by receiving-end modems of so called disturbing set of modem pairs at predefined first set of timeslots in the frequency spectrum on disturbing transmission medias. Cross-talk interference is detected on a disturbed transmission media used by a disturbed set of modem pair. The collision avoidance data from one of the disturbing medias caused the interference. A media control signal is sent at a predefined second set of timeslots by the disturbed set of modem pair on the disturbed media. The media control signal is reproduced on the disturbing media and is detected by the disturbing set of modem pair.

More in detail in a fourth embodiment, a further modem-pair, a so-called non-disturbing modem-pair detects a second reproduced media control signal. The second control signal is reproduced from the already mentioned media control signal sent by the disturbed set of modem pair on the disturbed media (see the earlier embodiments). The media control signal comprises in this embodiment information about transmission direction of the disturbed transmission media and is reproduced on the non-disturbing media due to a second cross-talk coupling. Due to the carried transmission direction information, the non-disturbing modem-pair can choose to either ignore the signal or to take measures to handle the situation.

The object of the present invention is to use capacity in the network in the sense that users in the system dynamically can seize the capacity they need if this disturbs no one else.

One advantage with the invention is that capacity can be allocated flexibly and according to need.

Another advantage is that no central coordinating device is needed.

Yet another advantage is that it is possible to increase traffic load without loosing control over the system. For moderate overall traffic loads, media utilization can be much better than static frequency planning. With increasing traffic load, the performance goes down towards that of a static frequency planning.

The invention will now be described more in detail with the aid of preferred embodiments in connection with the enclosed drawings.

DETAILED DESCRIPTION OF EMBODIMENTS

Figure 1A:
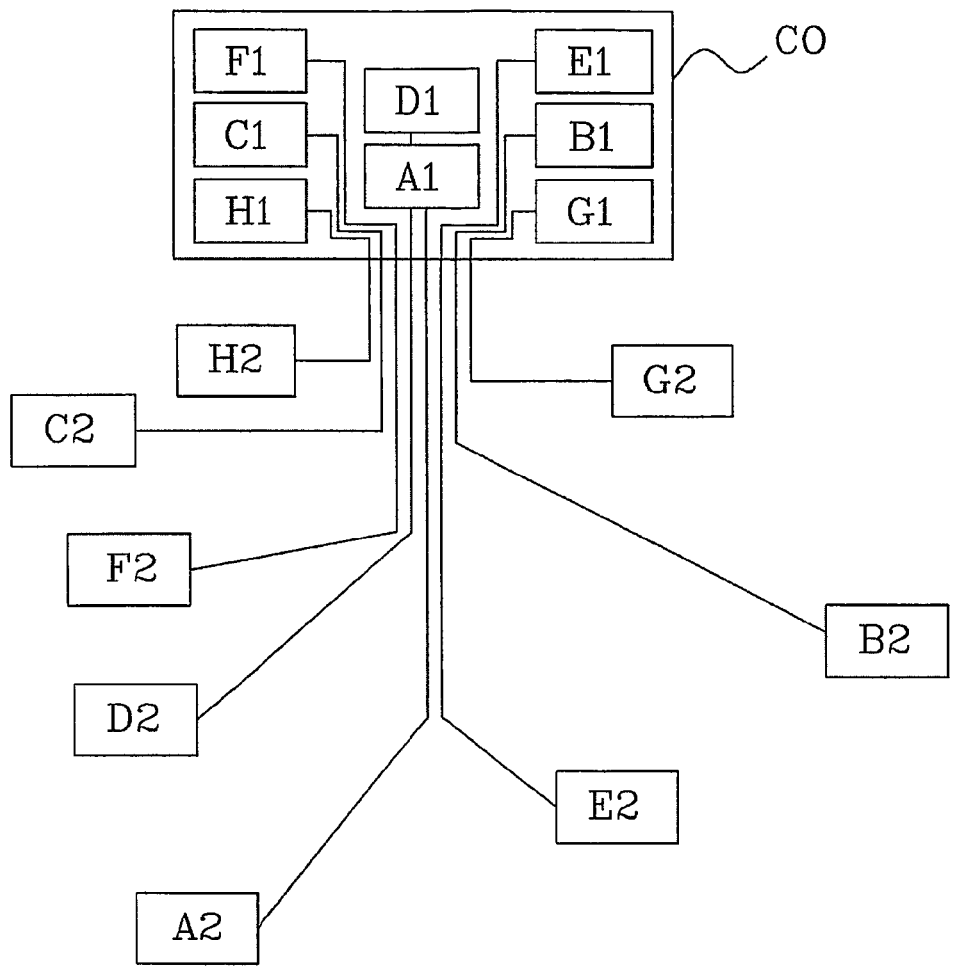
FIG. 1A shows a block schematic illustration of a communication system comprising modem pairs having receiving end modems and sending end modems.

FIG. 1A discloses an example broadband wireline communication system. The system in FIG. 1A is a copper wire installation that comprises a central office CO or a cabinet where modems are co-located. It is to be noted that this is an example and that the invention is not restricted to wireline systems. Additionally, instead of having a central office, more important is that modems are within cross-talk range from each other. The system comprises modem pairs A1-A2, B1-B2, C1-C2, D1-D2, E1-E2, F1-F2, G1-G2, H1-H2, each pair including a receiving end modem and a sending end modem. The modem pairs communicate on transmission media in either an upstream or downstream direction. In FIG. 1A, it can be seen that modem ends A1, B1, C1, D1, E1, F1, G1, H1 of the modem pairs are co-located while the other modem ends A2, B2, C2, D2, E2, F2, G2, H2 are at different locations. When a sending end modem transmits, it may cause near-end cross-talk NEXT to receiving end modems located close to it when using the same frequency band. Assume, for example, that the sending end modem H1 transmits to its receiving end modem H2. If the modem pair F1-F2 at the same time is using the same frequency band in the opposite direction, a receiving end modem F1 most likely will be disturbed by NEXT.

Figure 1B:
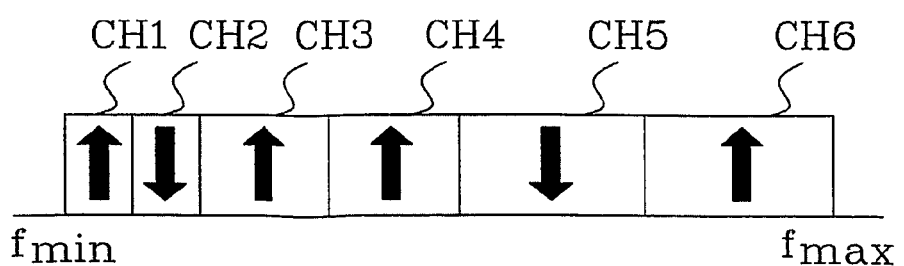
FIG. 1B shows the frequency spectrum divided into an example set of different frequency channels each having a defined default direction.

FIG. 1B discloses with arrows an example of how default transmission is defined for different frequency bands. From a resource sharing point-of-view in a time-asynchronous system, the relevant measure of what resources a modem uses for transmission is the distribution of power over the frequency band. When one modem wants to change the power and/or frequency allocation used on the line, then some control information describing the new transmission setup could be communicated to the other end. This control information may be communicated on a pair of pre-allocated control channels, for instance the two lowermost bands CH1 and CH2. Since in the present scenario there is no central resource controller, it is desirable to simplify the spectrum management scheme. One suitable way of doing this is to pre-define a set of frequency bands, each having a default transmission direction, i.e. either upstream or downstream. One example of a possible frequency layout is shown in FIG. 1B. The two lowermost bands CH1 and CH2 in the figure are set up for fixed use (i.e., in these bands it is never allowed to transmit in the opposite direction to the default). All other bands CH3, CH4, CH5 and CH6 are set up for a dynamic upstream or downstream use. A modem is allowed to freely use a frequency band in the default direction, possibly under some power restrictions. Under some harder restrictions, a modem can be allowed to use some frequency bands also in the reverse of the default direction. The idea is to allow a single user to use all available resources if no one else needs them at a given point in time. A modem that is using a frequency band in its opposite direction must be prepared to back off from that band if someone else wants to use it in the default direction.

As soon as resources are not needed any more, they should be released to allow other users to access them. Obviously this will cause variations in the cross-talk on the line. All users will however benefit from a significant reduction of the average interference level compared to the case when all modems are transmitting with a constant power whether they have data to transmit or not.

A prerequisite for the invention is that one or several resources in each frequency band regularly are set aside. These resources could be either sub frequency bands or time slots. Such a (small) resource could, for instance, be a few consecutive symbols out of a thousand. That is, after each thousand symbols, a small number of symbols (such as four) could not be used for regular data transmission. For instance, after one thousand symbols have been transmitted, one symbol period could be left silent, the next used in the opposite direction of the one thousand first, one more silent, and the another thousand symbols in the first direction, and so forth. The small resource can also be used to listen to cross-talk signals from other modems. One or several such small resource could also be a (small) portion of the spectrum in a frequency band. These small frequency portions of the spectrum should then always or at parts of the time be used in the opposite direction. Optionally, several such small resources could be avoided when placing data. A purpose of the unused resources and the reversing of transmission direction will be more obvious when the different embodiments are further analyzed later in the description.

Figure 2:
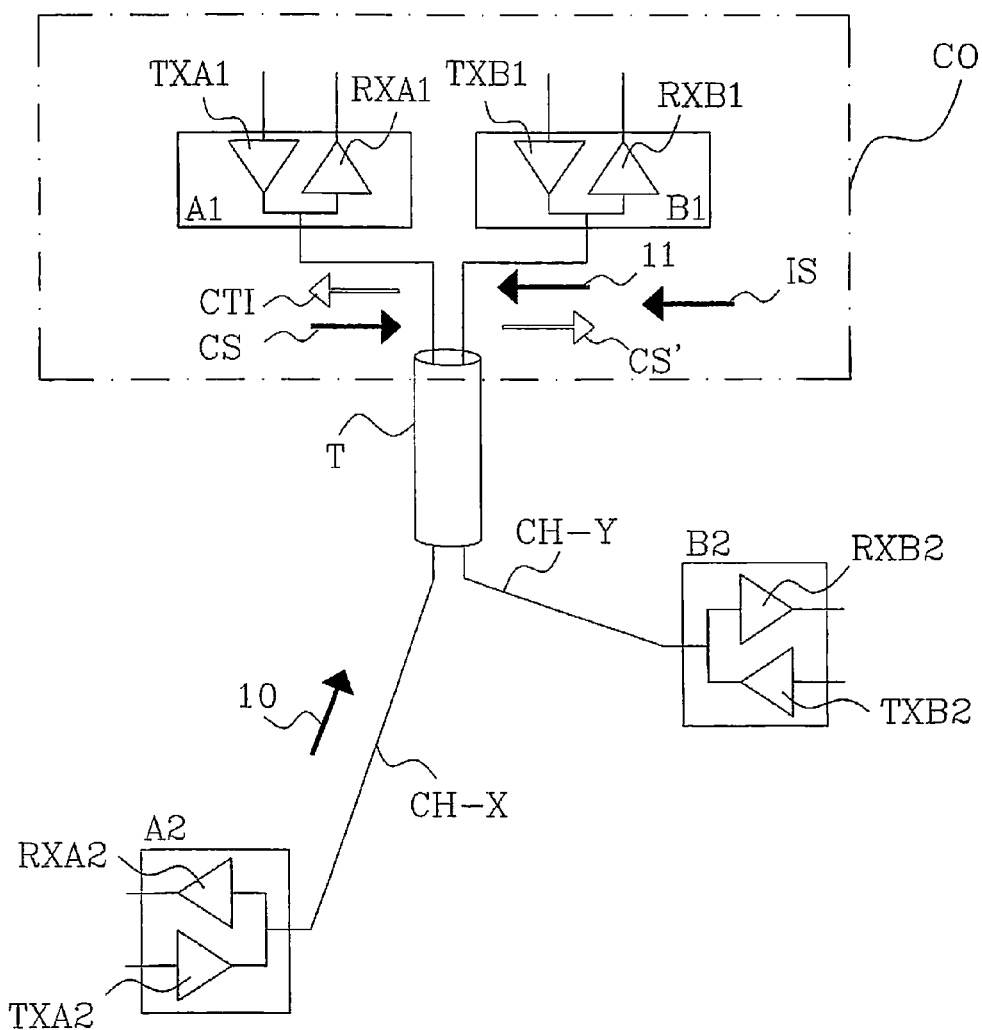
FIG. 2 shows a block schematic illustration of a communication system with a disturbing modem pair and a disturbed modem pair, each modem pair having a receiving end modem and a sending end modem. Signaling directions in the figure disclose the signaling in a first embodiment.

FIG. 2 discloses in a first embodiment of the invention, the modem pairs A1-A2 and B1-B2 of the modem pairs already shown in FIG. 1A. Each modem pair comprises a sending end modem and a receiving end modem. Two of the modem ends A1 and B1 of the modem pairs A1-A2 and B1-B2 are located within cross-talk range, as an example of location within the central office CO, and the two other modem ends A2 and B2 are located outside the central office. All of the modem ends A1, A2, B1 and B2 comprise each one, a transmitter TXA1, TXA2, TXB1 and TXB2 and a receiver RXA1, RXA2, RXB1 and RXB2. Each modem end A1, A2, B1 and B2 has the opportunity to become, within each frequency band, either a sending end modem or a receiving end modem. The current traffic situation decides which side of the modem pair that constitutes sending end or receiving end side. The modem ends A1 and A2 are in this example connected via a wire CH-X and thereby constitute the modem pair A1-A2. The modem ends B1 and B2 are connected via a wire CH-Y and constitute the modem pair B1-B2. The tube form symbol T symbolizes that the wires are close to each other within cross-talk range and that cross-talk coupling and interference can occur. In the example that now will be discussed, the modem end A2 is transmitting on frequency channel CH4 (shown in FIG. 1B). The modem end A2 thereby constitutes the sending end modem. The modem end A1 receives the transmission from A2 and thereby constitutes the receiving end side. As can be seen in FIG. 1B, frequency channel CH4 is defined to have the upstream direction as default direction. Upstream direction is in this example the direction towards the central office CO. The modem pair A1-A2 thereby communicates in the default direction.

A method according to the first embodiment of the invention will now be discussed. The method shows how cross-talk is used to communicate with a disturbing source and to send signals from a disturbed modem pair to a disturbing modem pair. Unfilled arrow symbols in FIG. 2 represent transmission signals after having passed the cross-talk coupling. From now on the modem pair A1-A2 is called the disturbed set of modem pair A1-A2 and the modem pair B1-B2 is called the disturbing set of modem pair B1-B2. The method comprises the following steps:

The sending end modem A2 of the disturbed set of modem pair A1-A2 transmits data 10 on the frequency channel CH4 to the receiving end side A1. Due to the long distance between the end modem B1 of the disturbing set of modem pair B1-B2 and the sending end modem A2 of the disturbed set of modem A1-A2, B1 will not hear the transmission from A1-A2. For the same reason the end modem B2 will not hear the transmission from A1-A2.

The modem B1 starts to transmit data 11 on its wire CH-Y on the same channel CH4 as the sending end modem A2 is transmitting on. This since B1 is unaware of the fact that the channel frequency CH4 is already occupied.

The receiving end modem A1 detects cross-talk interference CTI on wire CH-X on the disturbed channel CH4. The cross-talk interference is caused by the transmission on wire CH-Y used by the disturbing set of modem pair B1-B2. This due to the cross-talk coupling T between CH-Y and CH-X.

The receiving end modem A1 transmits a media control signal CS on the frequency channel CH4. As already have been mentioned when FIG. 1 was discussed, all modem pairs have the opportunity to reverse direction during short time intervals. A possible variation would be that also A2 transmits a media control signal.

The media control signal CS is reproduced from wire CH-X to wire CH-Y and becomes a reproduced media control signal CS'. This due to fact that interference is symmetric in the sense that if there is cross-talk coupling from CH-Y to CH-X, there is also cross-talk coupling in the opposite direction, from CH-X to CH-Y.

The reproduced media control signal CS' is detected by the disturbing sending end modem B1.

The disturbing set of modem pair B1-B2 leaves the channel frequency CH4. The disturbing modem pair is using the frequency channel CH4 in a direction opposite the defined default direction (see FIG. 1B) and is forced to take the consequences of this and leave the channel. Another possible scenario would be that the frequency channel CH4 was defined as having the opposite direction as default direction. The set of modem pair A1-A2 then used the frequency channel CH4 in a direction opposite the default direction while the modem pair B1-B2 was using the channel in the defined default direction. In this case the modem pair A1-A2 will leave the channel CH4. Optionally a media control signal can be sent by A1-A2 indicating that it is most desirably for A1-A2 to keep the channel. If the pair B1-B2 then has the possibility to find another channel, this may happen.

As an alternative to the shown embodiment, B1 instead, before starting to transmit its data 11, sends an intention signal IS in one resource within CH4, thereby announcing its intention to start transmitting. The modem pair A1-A2 can then follow the above pattern before actual data transmission by B1-B2 commences. This may prevent potential loss of data caused by collision. This alternative will now be exemplified by an example below.

Figure 3:
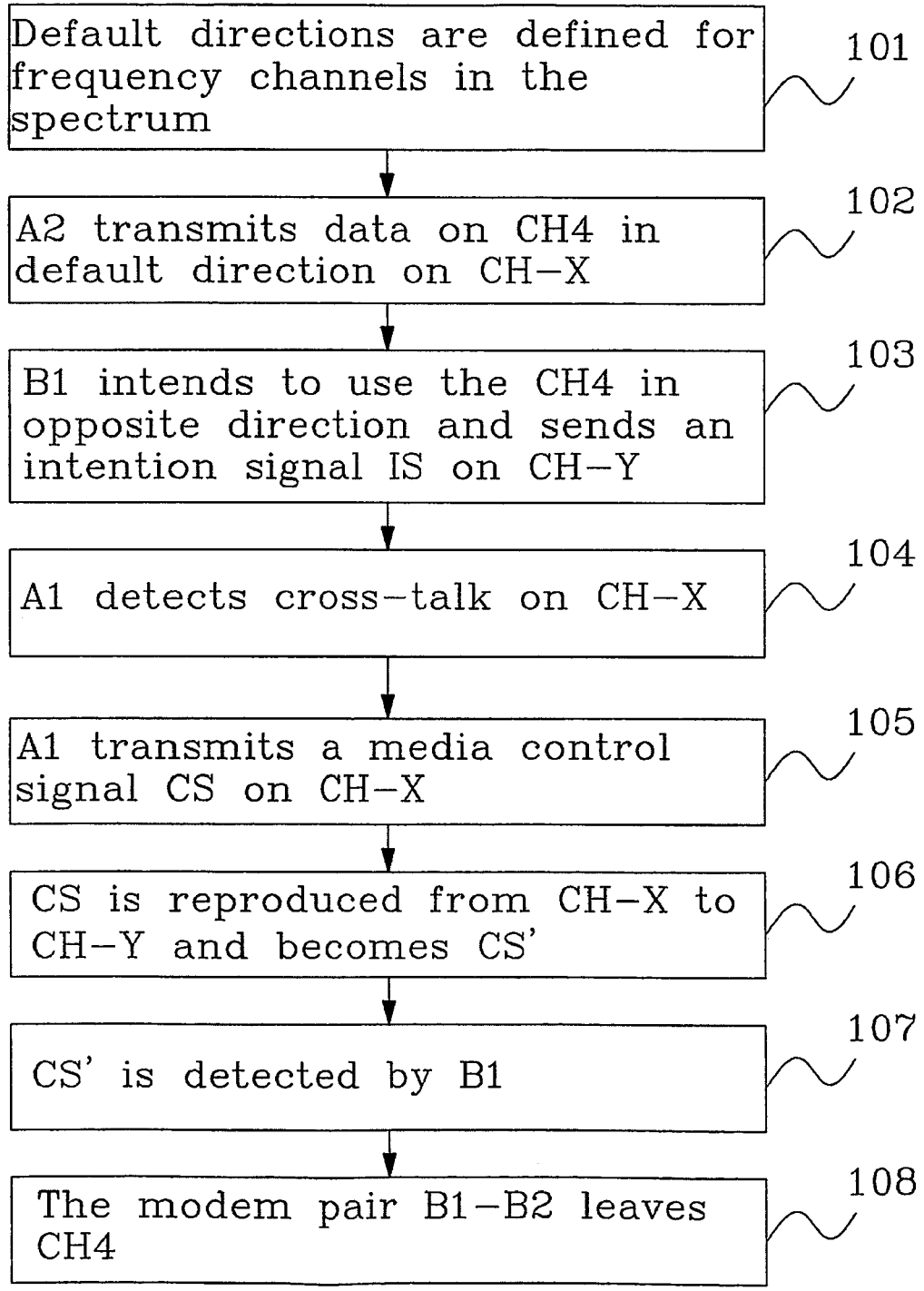
FIG. 3 shows a flow chart illustrating the first embodiment when an intention signal is used.

In FIG. 3 the most essential steps of the described first embodiment when using the intention signal is disclosed in a flow chart. The flow chart is to be read together with the earlier shown figures. The most essential steps are as follows:

The frequency channels CH3-CH6 in the frequency spectrum are defined regarding default directions. This is shown in FIG. 3 by a block 101.

The sending end modem A2 transmits data 10 on the frequency channel CH4 to the receiving end side A1. The modem pair A1-A2 is using the channel in the defined default direction. This is shown in the figure by a block 102.

The modem B1 intends to start transmitting data 11 on its wire CH-Y on the same channel CH4 as the sending end modem A2 is transmitting on. The modem pair B1-B2 will use the channel in a direction opposite the defined default direction. Before starting to transmit the data, B1 sends an intention signal IS in the direction opposite the default direction. This is shown in the figure by a block 103.

The receiving end modem A1 detects cross-talk interference CTI on wire CH-X on the disturbed channel CH4. The cross-talk interference is caused by the intention signal on wire CH-Y. This is shown in the figure by a block 104.

The receiving end modem A1 transmits a media control signal CS on the wire CH-X. This is shown in the figure by a block 105.

The media control signal CS is reproduced from wire CH-X to wire CH-Y and becomes a reproduced media control signal CS'. This is shown in the figure by a block 106.

The reproduced media control signal CS' is detected by the disturbing sending end modem B1. This is shown in the figure by a block 107.

The disturbing set of modem pair B1-B2 leaves the channel CH4. This is shown in the figure by a block 108.

Figure 4:
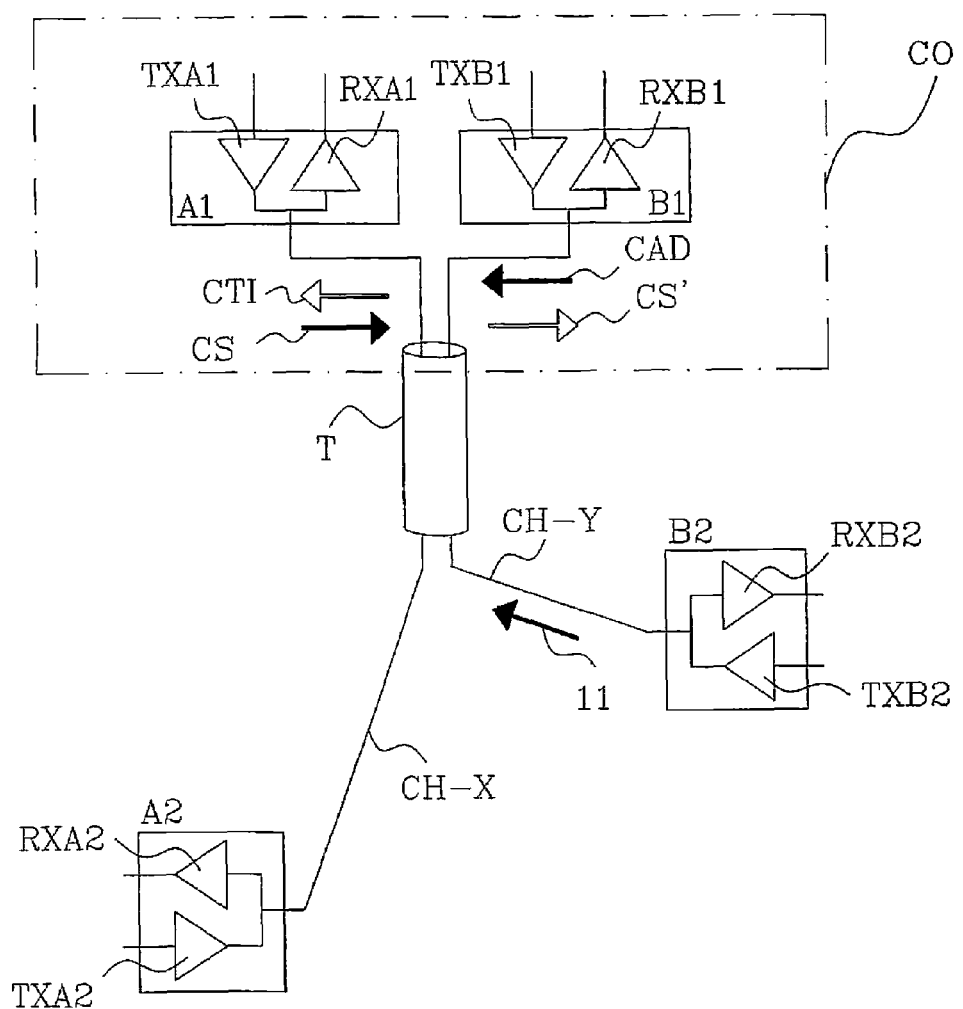
FIG. 4 shows a block schematic illustration of a communication system with two modem pairs. Signaling directions in the figure disclose the signaling in a second embodiment when collision avoidance data has been sent.

FIG. 4 discloses in a second embodiment of the invention, the modem pairs A1-A2 and B1-B2 already shown in FIG. 2. A method according to the invention will now be disclosed in connection with FIG. 4. In the method, the end modem B2 is acting as sending end modem and transmits data 11 to its receiving end modem B1 on the frequency channel CH5. The method will show, like before, how detection of cross-talk is used to communicate with a disturbing source and to send signals from a disturbed set of modem pair to a disturbing set of modem pair. The modem pair A1-A2 is like before called the disturbed set of modem pair and the modem pair B1-B2 is called the disturbing set of modem pair. The method comprises the following steps:

As mentioned, the sending end modem B2 transmits data 11 to its receiving end modem B1 on the wire CH-Y. Neither A1 nor A2 is affected by cross-talk due to the long distance from B2 to both A1 and A2. If the end modem A1 has the intention to start sending to its receiving end modem A2 on the same frequency as B2 is using, i.e. CH5, the cross-talk affecting B1 most likely will be catastrophically strong. This situation is to be avoided.

The receiving end modem B1 now temporarily becomes sending end modem and transmits during a short time interval collision avoidance data CAD in a resource of the frequency spectrum on channel CH5 in direction towards B2 which now temporarily has become receiving end modem. As already have been mentioned earlier in the description, also receiving end modems occasionally during short time intervals regularly can become sending end modems. This temporarily change will occur regularly.

The end modem A1 detects cross-talk interference CTI on wire CH-X on the channel CH5. The cross-talk interference is caused by transmission of collision avoidance data on wire CH-Y, due to the cross-talk coupling.

The end modem A1 of the disturbed set of modem pair A1-A2 transmits a media control signal CS on the frequency spectrum CH5. A possible variation would be that also A2 transmits a media control signal.

The media control signal CS is reproduced from wire CH-X to wire CH-Y and becomes a reproduced media control signal CS'. This due to fact that interference is symmetric in the sense that if there is cross-talk coupling from CH-Y to CH-X, there is also cross-talk coupling in the opposite direction from CH-X to CH-Y.

The reproduced media control signal CS' is detected by the disturbing receiving end which now again is modem B1.

Like earlier mentioned, different scenarios now can take place depending on if modem pair A1-A2 or modem pair B1-B2 are communicating in the default direction or in a direction opposite the default direction.

Figure 5:
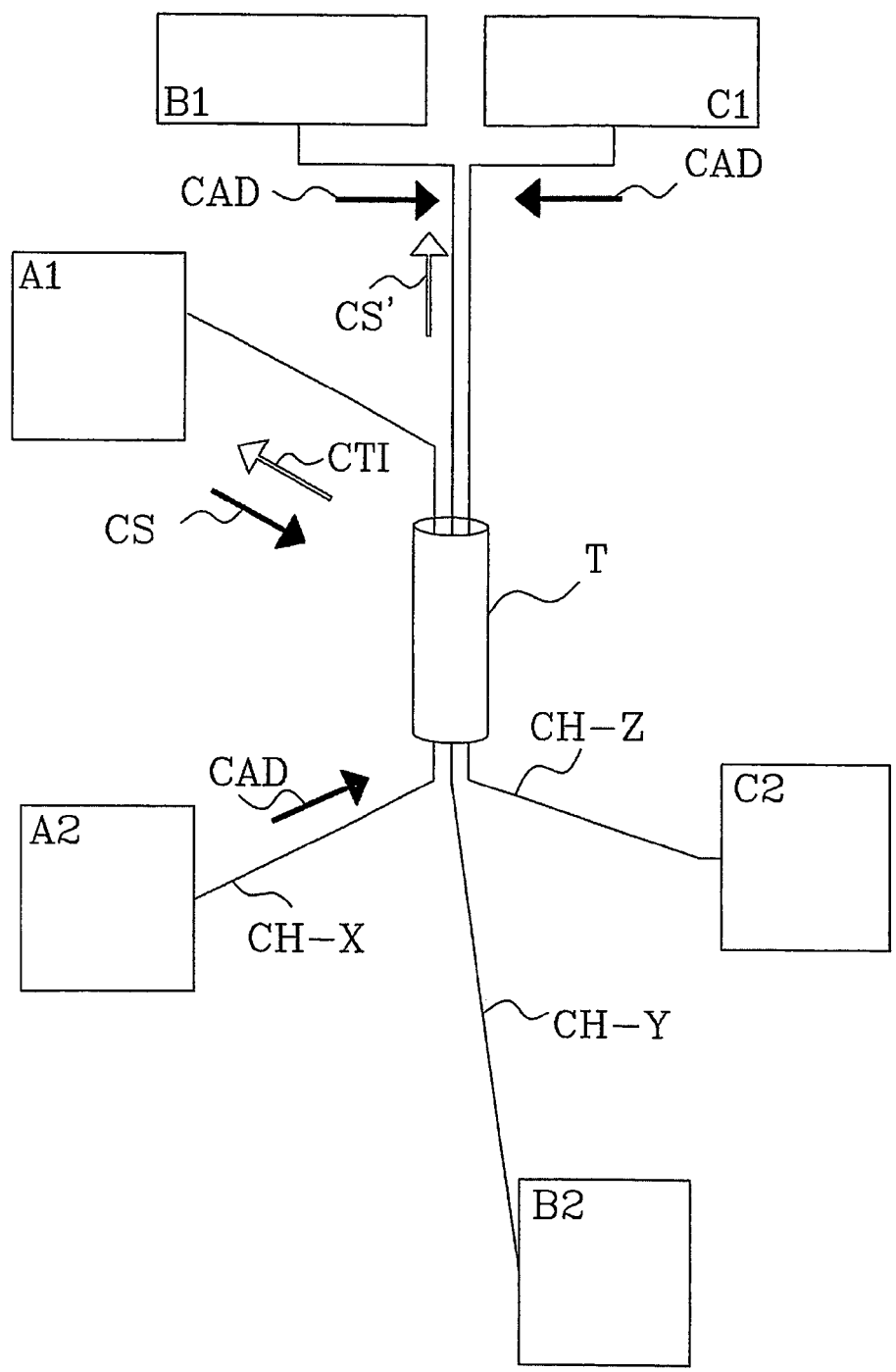
FIG. 5 shows a block schematic illustration of a communication system comprising modem pairs. Signaling directions in the figure disclose the signaling in a third embodiment of the invention whereby the modems have been synchronized in time.

FIG. 5 discloses a third embodiment of the invention. The modem pairs already shown in FIG. 4 are also shown in FIG. 5. A third modem pair C1-C2 can also be seen in the figure. The third modem pair C1-C2 is of the same type as A1-A2 and B1-B2 and is thereby considered to already have been described. It is of course possible to have also other modem pairs in the system but in an attempt to make the figure clearer other modems have been left out. Transmission on media CH-X, CH-Y, CH-Z is in this embodiment divided into timeslots. A first set of timeslots is defined for collision avoidance data and a second set of timeslots for media control signals. Collision avoidance data is then transmitted in the predefined set of timeslots in the frequency spectrum of disturbing transmission medias, by receiving-end modems of so called disturbing set of modem pairs. In this example, end modems B2 and optionally C2 are the sending end modems sending regular data, while the end modems B1 and C1 are the receiving end modems sending collision avoidance data CAD. The method comprises the following steps:

Collision avoidance data CAD are transmitted at predefined first set of timeslots of the frequency spectrum of the medias CH-Y, CH-Z, in this example by the receiving-end modems B1, C1.

Cross-talk interference CTI is detected at the predefined first set of timeslots on a disturbed media CH-X by the disturbed receiving end modem A1. The interference is received from a disturbing media CH-Y used by a disturbing set of modem pair B1-B2. This due to the sending of collision avoidance data CAD by B1 and due to a cross-talk coupling T.

A media control signals CS is transmitted at a predefined second timeslot of the frequency spectrum by the disturbed receiving end modem A1 on the disturbed media CH-X.

A reproduced media control signal CS' is detected at the predefined second timeslot on the disturbing media CH-Y by B1 of the disturbing set of modem pair B1-B2.

In order to avoid destructive NEXT interference, all involved modem pairs A1-A2, B1-B2 and C1-C2 in the system that are subject to interference should be synchronized in time. A description of symbol synchronization in a DMT system with cross-talk interference can be found in the European patent application EP 1093248. All embodiments where frequency bands have been divided into sub bands are applicable also when the frequency bands have been divided into timeslots.

Figure 6:
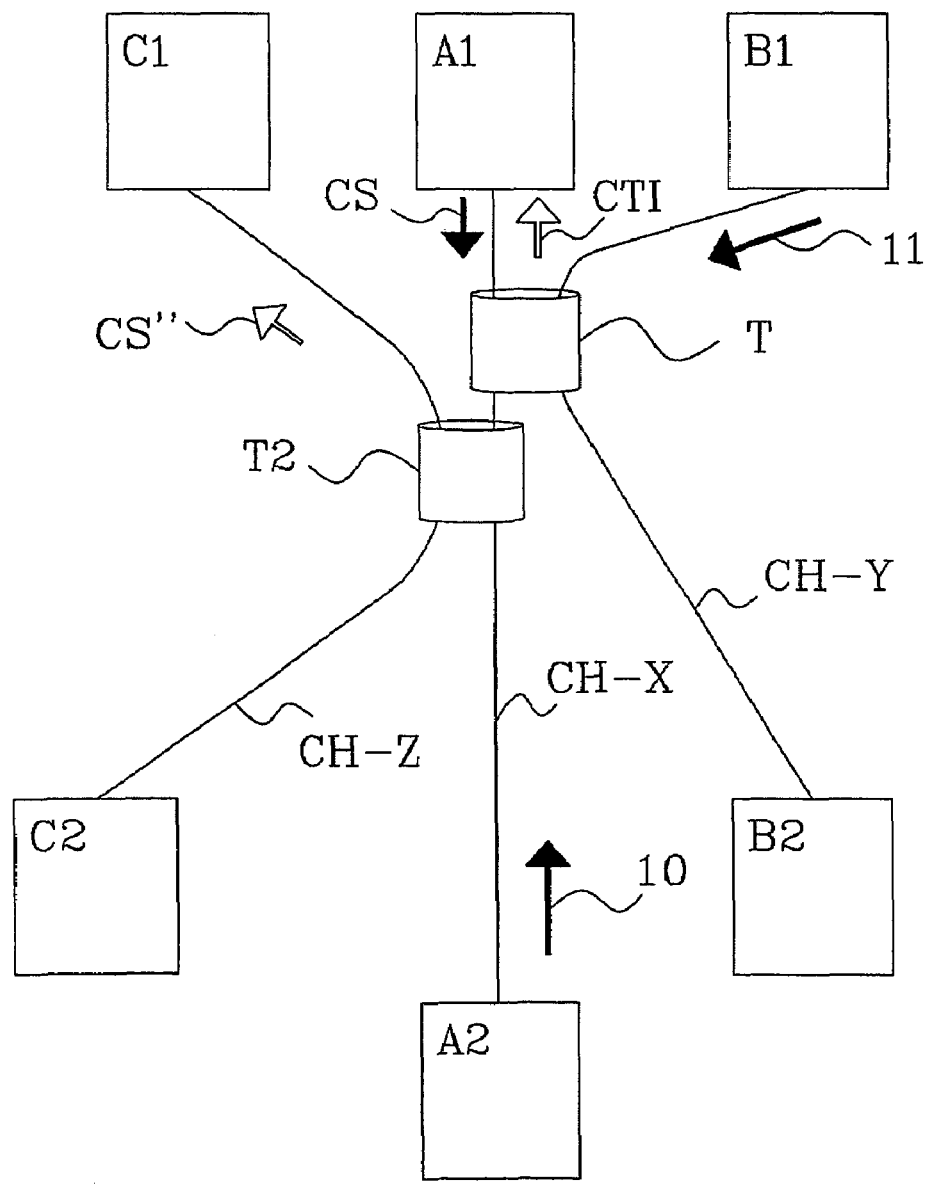
FIG. 6 shows a block schematic illustration of a communication system comprising a disturbing modem pair, a disturbed modem pair and a non-disturbed modem pair, in a fourth embodiment of the invention.

FIG. 6 discloses in a fourth embodiment, an example of a situation where a non-disturbing media accidentally is affected by the media control signal. In FIG. 6, the modem pairs A1-A2 and B1-B2 are shown together with a third modem pair C1-C2. A1 and B1 are within cross-talk range from each other as well as A1 and C1, while B1 and C1 are not within cross-talk range from each other. A1-A2 is called the disturbed modem pair. B1-B2 is called the disturbing modem pair, and C1-C2 is called the non-disturbing modem pair.

The situation that now will be discussed follows the earlier shown procedure discussed in the first embodiment and shown in FIG. 2, i.e. the situation when A2 transmits data 10 in an upward direction, and B1 transmits data 11 in a downward direction. A1 detects cross-talk interference CTI due to the cross-talk coupling T between CH-Y and CH-X and transmits a media control signal CS. However, due to a second cross-talk coupling T2 between CH-X and a non-disturbing media CH-Z used by the non-disturbing modem pair C1-C2, the media control signal is also reproduced to CH-Z and becomes a second reproduced media control signal CS". C1 hereby assumes that it has disturbed a modem pair—which is not true. In order to avoid this situation, the media control signal carries information about the current transmission direction of the disturbed modem pair A1-A2 that was sending the signal.

In the frequency sub band case, the media control signal carries information about the current transmission direction of the disturbed modem pair by configuration of sub bands in the frequency band in the spectrum. In the time synchronized case, the media control signal instead demonstrates the direction by the way the time slot pattern is configured when sent by the disturbed modem pair. If the indicated transmission direction is the same direction as the direction the modem pair C1-C2 is using, the non-disturbing modem pair C1-C2 will ignore the second reproduced media control signal CS".

It is to be noted that a possible scenario would be that a reproduced media control signal is detected only on the non-disturbing media but not on the disturbing media. This, if for example the disturbing media for some reason is disturbed or turned off before the reproduced media control signal is detected.

Different variations are of course possible within the scope of the invention. The media control signal can for example be repeated on the disturbed transmission media by the signal sending modem. This is for redundancy purpose and prevents unintentional loss of the signal due to a disturbance before it has been received. In another example, in order to point out to other transmission medias in the communication system that a sudden change of transmission direction is about to take place in the system, a reproduced media control signal CS', CS" received by a transmission media is forwarded to at least one other closely related transmission media in the system. The reproduced media control signal is in this way propagated through the communication system.

The invention is in other words not limited to the above described and in the drawings shown embodiments but can be modified within the scope of the enclosed claims.

The invention claimed is:

1. A method in a communication system for dynamically allocating communication system frequency spectrum after detecting cross-talk interference (CTI) on a disturbed transmission medium, wherein the CTI is caused by transmission on a disturbing transmission medium due to a cross-talk-connection between the media, said method comprising the steps of:
   transmitting a media control signal on the disturbed transmission medium between a first modem and a second modem as a result of the previously detected CTI;
   detecting a reproduced media control signal on the disturbing transmission medium by a third modem or a fourth modem, said reproduced media control signal being reproduced from the media control signal transmitted on the disturbed transmission medium due to the cross-talk connection; and
   dynamically allocating by the third and fourth modems, a different frequency spectrum to the disturbing transmission medium to eliminate the CTI.

2. The method in a communication system for dynamically allocating communication system frequency spectrum according to claim 1, wherein the frequency spectrum is divided into frequency bands, each band being divided into sub bands.

3. The method in a communication system for dynamically allocating communication system frequency spectrum according to claim 1, wherein the frequency spectrum is divided into frequency bands, each band being divided into timeslots.

4. The method in a communication system for dynamically allocating communication system frequency spectrum according to claim 1, wherein the CTI comprises an intention signal transmitted on the disturbing transmission medium before transmission of regular data.

5. The method in a communication system for dynamically allocating communication system frequency spectrum according to claim 1, wherein the CTI comprises collision avoidance data regularly transmitted on the disturbing transmission medium in a direction opposite the transmission direction of regular data.

6. The method in a communication system for dynamically allocating communication system frequency spectrum according to claim 1, wherein the frequency spectrum is divided into frequency bands and each band has a defined default direction.

7. The method in a communication system for dynamically allocating communication system frequency spectrum according to claim 1, wherein the media control signal is repeated on the disturbed transmission medium, for redundancy purpose.

8. The method in a communication system for dynamically allocating communication system frequency spectrum according to claim 1, wherein the first modem transmits the media control signal to the second modem, and the second modem repeats the media control signal back to the first modem on the disturbed transmission medium.

9. The method in a communication system for dynamically allocating communication system frequency spectrum according to claim 1, further comprising the step of:
   detecting a second reproduced media control signal on a non-disturbing transmission medium, reproduced due to a second cross-talk connection.

10. The method in a communication system for dynamically allocating communication system frequency spectrum according to claim 1, wherein the media control signal comprises information about transmission direction of the disturbed transmission medium.

11. The method in a communication system for dynamically allocating communication system frequency spectrum according to claim 1, further comprising the step of:
   repeating the reproduced media control signal received by a transmission medium, with the purpose of forwarding it to another, at least one, transmission medium in the system.

12. A method in a communication system for dynamically allocating communication system frequency spectrum after cross-talk interference between modem pairs, each pair being used for upstream and downstream communication via transmission medias in the frequency spectrum, said method comprising the steps of:
   detecting by a disturbed modem pair, cross-talk interference (CTI) on a disturbed medium used by the disturbed modem pair, said interference being caused by transmission on a disturbing medium used by a disturbing modem pair, due to a cross-talk coupling;
   transmitting a media control signal by the disturbed modem pair on the disturbed medium, as a result of the previously detected CTI:
   detecting by the disturbing modem pair, a reproduced media control signal on the disturbing medium, reproduced due to the cross-talk coupling; and
   dynamically allocating by the disturbed modem pair, communication system frequency spectrum to the disturbed transmission medium to eliminate the CTI.

13. A method in a communication system for dynamically allocating communication system frequency spectrum after cross-talk interference between modem pairs, each pair being used for upstream and downstream communication via transmission media in the frequency spectrum, said method comprising the steps of:
   regularly transmitting collision avoidance data on a first channel of the frequency spectrum on a disturbing medium by a receiving-end modem of a disturbing modem pair;
   detecting cross-talk interference (CTI) on a disturbed medium used by a disturbed modem pair operating on the first channel, said interference being caused by cross-talk coupling due to transmission of the collision avoidance data on the disturbing medium by the receiving-end modem;

transmitting a media control signal by one of the modems of the disturbed modem pair on the disturbed medium, as a result of the previously detected CTI;

detecting by the disturbing modem pair, a reproduced media control signal on the disturbing medium, reproduced due to the cross-talk coupling; and changing to a second channel of the frequency spectrum by either the disturbing modem pair or the disturbed modem pair, wherein the first channel has a default direction of transmission, and the modem pair that changes to the second channel is the pair that is transmitting in a direction opposite to the default direction of transmission.

14. A method in a communication system for dynamically allocating communication system frequency spectrum after cross-talk interference between modem pairs in the system, each pair being used for upstream and downstream communication via a plurality of transmission media in the frequency spectrum, said method comprising the steps of:

time-synchronizing all modem pairs in the system that are subject to cross-talk interference;

periodically transmitting by synchronized receiving-end modems, collision avoidance data at a predefined first set of time slots in the frequency spectrum on each of the transmission media;

detecting cross-talk interference at a predefined first set of timeslots on a disturbed medium used by a disturbed modem pair, said interference being caused by transmission on a disturbing medium used by a disturbing modem pair, due to a cross-talk coupling;

transmitting a media control signal at a predefined second set of time slots by the disturbed modem pair on the disturbed medium, as a result of the previously detected cross-talk interference; and detecting by the disturbing modem pair, a reproduced media control signal, reproduced due to the cross-talk coupling, at the predefined second set of time slots on the disturbing medium.

15. A method in a communication system for dynamically allocating communication system frequency spectrum after cross-talk interference between transmission media used for upstream and downstream communication in the frequency spectrum, said method comprising the steps of:

detecting by a disturbed modem, cross-talk interference on a disturbed transmission medium, said interference being caused by transmission by disturbing modems on a disturbing transmission medium due to a cross-talk-connection between the media;

transmitting by the disturbed modem, a media control signal on the disturbed transmission medium as a result of the previously detected cross-talk interference; and detecting by at least one other modem, a reproduced media control signal on at least one other transmission medium, said reproduced media control signal being reproduced from the media control signal due to at least one cross-talk coupling between media.

16. The method in a communication system for dynamically allocating communication system frequency spectrum after cross-talk interference according to claim 15, further comprising the step of:

detecting a second reproduced media control signal on a non-disturbing transmission channel, reproduced due to a second cross-talk coupling.

17. An arrangement in a communication system for dynamically allocating communication system frequency spectrum after cross-talk interference between transmission media used for upstream and downstream communication in the frequency spectrum, said arrangement comprising:

means for detecting cross-talk interference on a disturbed transmission medium said interference being caused by transmission on a disturbing transmission medium due to a cross-talk-connection between the media;

means for transmitting a media control signal on the disturbed transmission medium as a result of the previously detected cross-talk interference;

means for detecting a reproduced media control signal on the disturbing transmission medium, reproduced from the media control signal due to the cross-talk connection; and means for dynamically allocating different frequency spectrum to the disturbed or disturbing transmission media to eliminate the CTI.

18. The arrangement in a communication system for dynamically allocating communication system frequency spectrum after cross-talk interference according to claim 17, further comprising means for transmitting an intention signal on the disturbing transmission medium before transmission of regular data.

19. The arrangement in a communication system for dynamically allocating communication system frequency spectrum after cross-talk interference according to claim 17, further comprising means for transmitting collision avoidance data on the disturbing transmission medium in a direction opposite the transmission direction of regular data.

20. The arrangement in a communication system for dynamically allocating communication system frequency spectrum after cross-talk interference according to claim 17, further comprising means for repeating the media control signal on the disturbed transmission medium, for redundancy purpose.

21. The arrangement in a communication system for dynamically allocating communication system frequency spectrum after cross-talk interference according to claim 17, wherein the means for transmitting the media control signal includes means for sequentially transmitting the media control signal from each end of the disturbed transmission medium to an opposite end.

22. The arrangement in a communication system for dynamically allocating communication system frequency spectrum after cross-talk interference according to claim 17, further comprising means for detecting a second reproduced media control signal on a non-disturbing transmission medium.

* * * * *